(12) United States Patent
Ando

(10) Patent No.: US 11,467,004 B2
(45) Date of Patent: Oct. 11, 2022

(54) ROTATIONAL ANGLE SENSOR

(71) Applicant: AISIN CORPORATION, Aichi (JP)

(72) Inventor: Shinsuke Ando, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/062,093

(22) Filed: Oct. 2, 2020

(65) Prior Publication Data

US 2021/0131830 A1    May 6, 2021

(30) Foreign Application Priority Data

Oct. 30, 2019  (JP) .............................. JP2019-197107

(51) Int. Cl.
*G01D 5/20* (2006.01)
*G01B 7/30* (2006.01)

(52) U.S. Cl.
CPC ............. *G01D 5/2086* (2013.01); *G01B 7/30* (2013.01)

(58) Field of Classification Search
CPC .... G01D 2205/77; G01D 5/20; G01D 5/2046; G01D 5/2053; G01D 5/2086; G01B 7/003; G01B 7/30
See application file for complete search history.

(56) References Cited

U.S. PATENT DOCUMENTS

| 5,903,205 | A | * | 5/1999 | Goto | ...................... G01D 5/204 |
| | | | | | 336/130 |
| 6,236,199 | B1 | | 5/2001 | Irle et al. | |
| 8,421,446 | B2 | | 4/2013 | Straubinger et al. | |
| 2016/0131503 | A1 | * | 5/2016 | Goto | ................... G01D 5/2291 |
| | | | | | 324/207.17 |

FOREIGN PATENT DOCUMENTS

| EP | 0 909 955 B1 | 9/2009 |
| EP | 2 038 616 B1 | 1/2013 |
| JP | 2009-540277 A | 11/2009 |
| JP | 5360720 B2 | 12/2013 |

* cited by examiner

*Primary Examiner* — Jermele M Hollington
*Assistant Examiner* — Suresh K Rajaputra
(74) *Attorney, Agent, or Firm* — Oblon, McClelland, Maier & Neustadt, L.L.P.

(57) ABSTRACT

A rotational angle sensor includes a rotary plate and a printed circuit board in which a primary coil and a secondary coil group are arranged. Loops of the primary coil and the secondary coil group are along a surface of the printed circuit board. The rotary plate includes a target portion whose outer circumferential edge portion has a sine-wave shape. The primary coil overlaps with the target portion, and has a circular-arc shape along a rotational direction of the rotary plate. The secondary coil group includes 4n (n is a natural number) secondary coils arranged in a line along the rotational direction, on an inner circumferential side of the primary coil. The number of turns of a secondary coil on an end side in a line is smaller than that of a secondary coil on an inner side in the line.

6 Claims, 7 Drawing Sheets

ROTATIONAL ANGLE SENSOR

CROSS REFERENCE TO RELATED APPLICATIONS

This application is based on and claims priority under 35 U.S.C. § 119 to Japanese Patent Application 2019-197107, filed on Oct. 30, 2019, the entire content of which is incorporated herein by reference.

TECHNICAL FIELD

This disclosure generally relates to a rotational angle sensor.

BACKGROUND DISCUSSION

U.S. Pat. No. 6,236,199B (Reference 1) describes an inductive angle sensor including a rotor (one example of a rotary plate and a target portion) where a closed circuit pattern is formed, an excitation coil connected to an LC oscillator circuit that generates a sine wave, and a reception coil. In this sensor, by an alternating magnetic field generated by the excitation coil, induced current (eddy current) is generated in the closed circuit pattern of the rotor, and fluctuation in magnetic field generated by the induced current is received by the reception coil, whereby a rotational angle of the rotor is detected.

JP2009-540277A (Reference 2) describes a sensor system for detecting a rotational angle that includes a rotor whose outer circumferential surface is provided with an encoder structure, and includes a printed circuit board where an inductance element for generating a magnetic field is formed. In this sensor system, eddy current loss of the encoder structure when the inductance element is caused to generate a magnetic field is detected as a change in inductance of the inductance element, whereby a rotational angle of the rotor is detected.

In a sensor as in Reference 1, there is a problem that a circuit pattern such as a coil needs to be formed in the rotary plate, and thus, cost is increased. In a sensor system as in Reference 2, there is a problem that a large number of coils for generating magnetic fields are required, and thus, power consumption is increased, and the coils are inevitably made small, resulting in that unevenness tends to occur in a magnetic field distribution at the rotary plate or the target portion, and accuracy of detecting a rotational angle is reduced.

A need thus exists for a rotational angle detection sensor which is not susceptible to the drawback mentioned above.

SUMMARY

A rotational angle sensor includes an annular rotary plate and a printed circuit board. The rotary plate is made of metal. In the printed circuit board, a primary coil supplied with high-frequency current and a secondary coil group outputting induced current to a detection IC detecting the induced current are arranged in such a way that loops of the primary coil and the secondary coil group are along a surface of the printed circuit board. The rotary plate includes a target portion whose outer circumferential edge portion or inner circumferential edge portion is formed in a sine-wave shape. The primary coil is arranged in such a way as to overlap with the target portion in a plan view of the printed circuit board, and is formed in a circular-arc shape along a rotational direction of the rotary plate. The secondary coil group includes 4n (n is a natural number) secondary coils arranged in a line along the rotational direction, on an inner circumferential side of the primary coil. The number of turns of the secondary coil on an end side in the line is smaller than the number of turns of the secondary coil on an inner side in the line.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A rotational angle detection sensor according to an embodiment of this disclosure is described with reference to the drawings. Although the case where the rotational angle detection sensor is mounted in a motor is described as an exemplification in the following, the rotational angle sensor may be used for a purpose of detecting an angle in any application, and may be used as various angle detection devices that are mounted in a vehicle or the like and whose examples include a rotational angle sensor for a rotary electrical machine such as a motor or a generator, a steering operation angle sensor or a steering angle sensor for a steering mechanism, a shift position sensor, a vehicle height sensor, a stroke sensor for an accelerator pedal, a brake pedal, or a clutch, and a rotational speed sensor for a wheel.

[Description of Motor in Which Rotational Angle Detection Sensor is Mounted]

Figure 1:
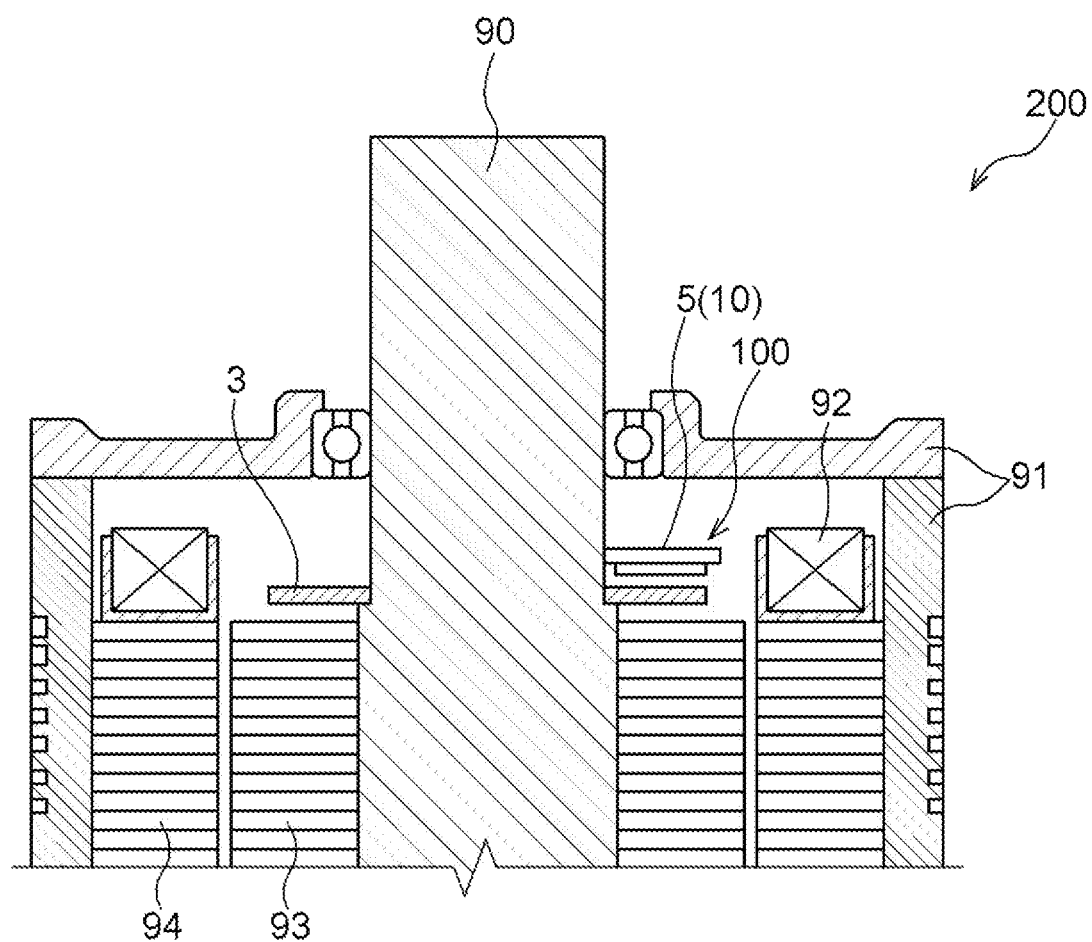
FIG. 1 is a diagram illustrating a schematic configuration of a motor in which a rotational angle detection sensor is mounted.

FIG. 1 illustrates a structure of a motor 200 in which a rotational angle detection sensor (hereinafter, referred to as the sensor 100) is mounted. In the exemplified case, the motor 200 is an induction electric motor that includes the sensor 100, a shaft 90 outputting power of the motor 200 to an outside, a rotor 93 rotating integrally with the shaft 90, a stator 94 including a stator coil 92 and applying magnetic force to the rotor 93, and a motor casing 91 accommodating these. In the motor 200, a rotating magnetic field generated by alternating current supplied to the stator coil 92 is applied to the rotor 93 via the stator 94, and induced current is thereby generated in the rotor 93, whereby the rotor 93 is rotated relative to the stator 94. Rotational power generated by the rotation of the rotor 93 is output to an outside by the shaft 90. One end of the shaft 90 extends in such a way as to exist at an outside of the motor casing 91 while being supported by a bearing at an opening portion provided in the motor casing 91. The motor 200 is mounted in a vehicle, for example, and is used as a power source for running or a drive source for each portion of the vehicle. Hereinafter, the case where the motor 200 includes eight poles is described as an exemplification.

The sensor 100 includes a sensor body 10 and a rotary plate 3 that rotates integrally with the shaft 90. The sensor 100 detects a rotational angle of the rotary plate 3, and an angular velocity of rotation, the number of rotations per unit time (rotational speed), or the like, with the angular velocity and the number of rotations concerning the rotary plate 3 being acquired based on the rotational angle. The sensor 100 outputs these as information (hereinafter, referred to as "rotational angle information") such as the rotational angle of the rotor 93 to a control circuit or the like (an unillustrated ECU incorporated in the vehicle, for example) of the motor 200. In the motor 200 illustrated in FIG. 1, the rotor 93, the rotary plate 3, and the sensor body 10 are arranged in this order in an axial direction of the shaft 90, and the rotary plate 3 and the sensor body 10 overlap with each other in a view in the axial direction. Hereinafter, in some cases, the axial direction of the shaft 90 and the same direction as the axial direction are simply referred to as the axial direction.

The sensor 100 applies, to the rotary plate 3, an alternating magnetic field generated by the sensor body 10, and thereby causes eddy current to be generated in the rotary plate 3. Then, based on a magnetic field generated by this eddy current, the sensor 100 acquires rotational angle information, and outputs the rotational angle information to an outside.

[Detailed Description of Rotational Angle Detection Sensor]

[Description of Basic Form of Rotational Angle Detection Sensor]

As described above, as illustrated in FIG. 1, the sensor 100 includes the sensor body 10 and the rotary plate 3 that rotates integrally with the shaft 90 of the motor 200. The sensor body 10 is arranged in such a way as to face the rotary plate 3. The sensor body 10 is formed in a plate shape and in a circular-arc shape along a circumferential direction of the rotary plate 3 as described below.

Figure 2:
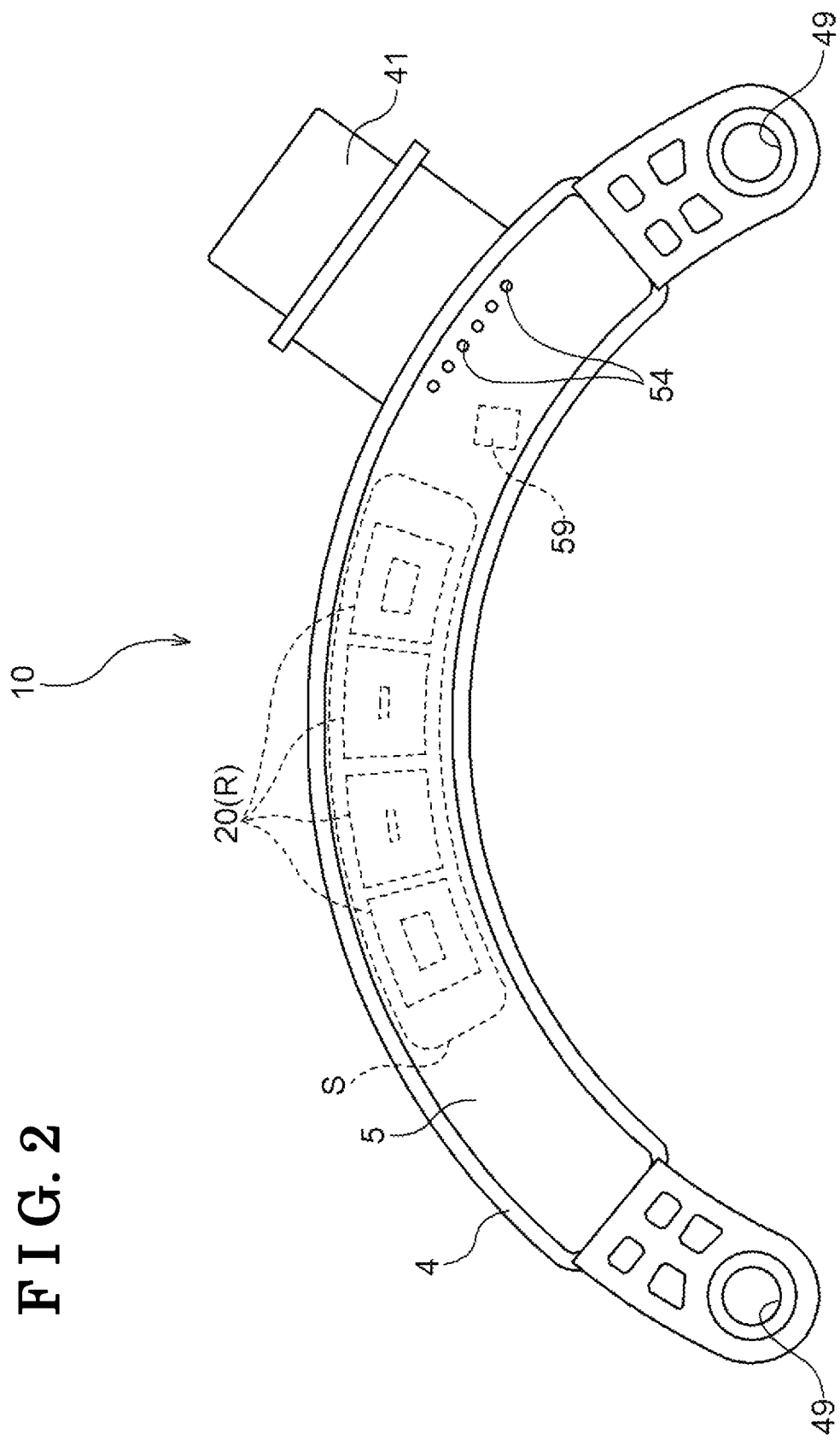
FIG. 2 is a diagram illustrating a structure of a sensor body of a rotational angle detection sensor.

FIG. 2 is a diagram schematically illustrating, in a plan view of the circular arc (axial-direction view), a structure of the sensor body 10 formed in the circular-arc and plate shape. As illustrated in FIG. 2, the sensor body 10 includes an arc-shaped casing 4 made of resin, an arc-shaped printed circuit board 5, and an output connector 41 fixed to the casing 4 and electrically connected to the printed circuit board 5. Mounted in the printed circuit board 5 are a first coil S (one example of a primary coil), a second coil group R (one example of a secondary coil group), and a sensor IC 59 (one example of a detection IC). The sensor body 10 is screw-fixed to the motor casing 91 of the motor 200, for example, by inserting bolt screws or the like into penetration holes 49 and 49 formed at both ends of the casing 4, for example.

The sensor 100 applies, to the rotary plate 3, an alternating magnetic field (hereinafter, referred to as a first magnetic field) generated by supplying high-frequency current to the first coil S (refer to FIG. 1), and thereby causes eddy current to be generated in the rotary plate 3. Then, a magnetic field (hereinafter, referred to as a second magnetic field) generated by the eddy current in the rotary plate 3 is received by the second coil group R, and fluctuation in induced current generated in the second coil group R is detected by the sensor IC 59, whereby a rotational angle, and an angular velocity or the number of rotations of the rotary plate 3 are detected. Then, information such as the rotational angle is output to an outside through the output connector 41.

[Detailed Description of Each Portion of Rotational Angle Detection Sensor]

[Sensor Body]

As illustrated in FIG. 2, the sensor body 10 includes the casing 4 made of resin and formed in the circular-arc and thick-plate shape, the printed circuit board 5 formed in the circular-arc and plate shape, and the output connector 41 fixed to the casing 4 and electrically connected to the printed circuit board 5. In the present embodiment, the printed circuit board 5 is embedded in the casing 4 by insert molding or the like. In the printed circuit board 5, the first coil S and the second coil group R are formed. The printed circuit board 5 and the first coil S and the second coil group R formed in the printed circuit board 5 are described below.

[Rotary Plate]

Figure 3:
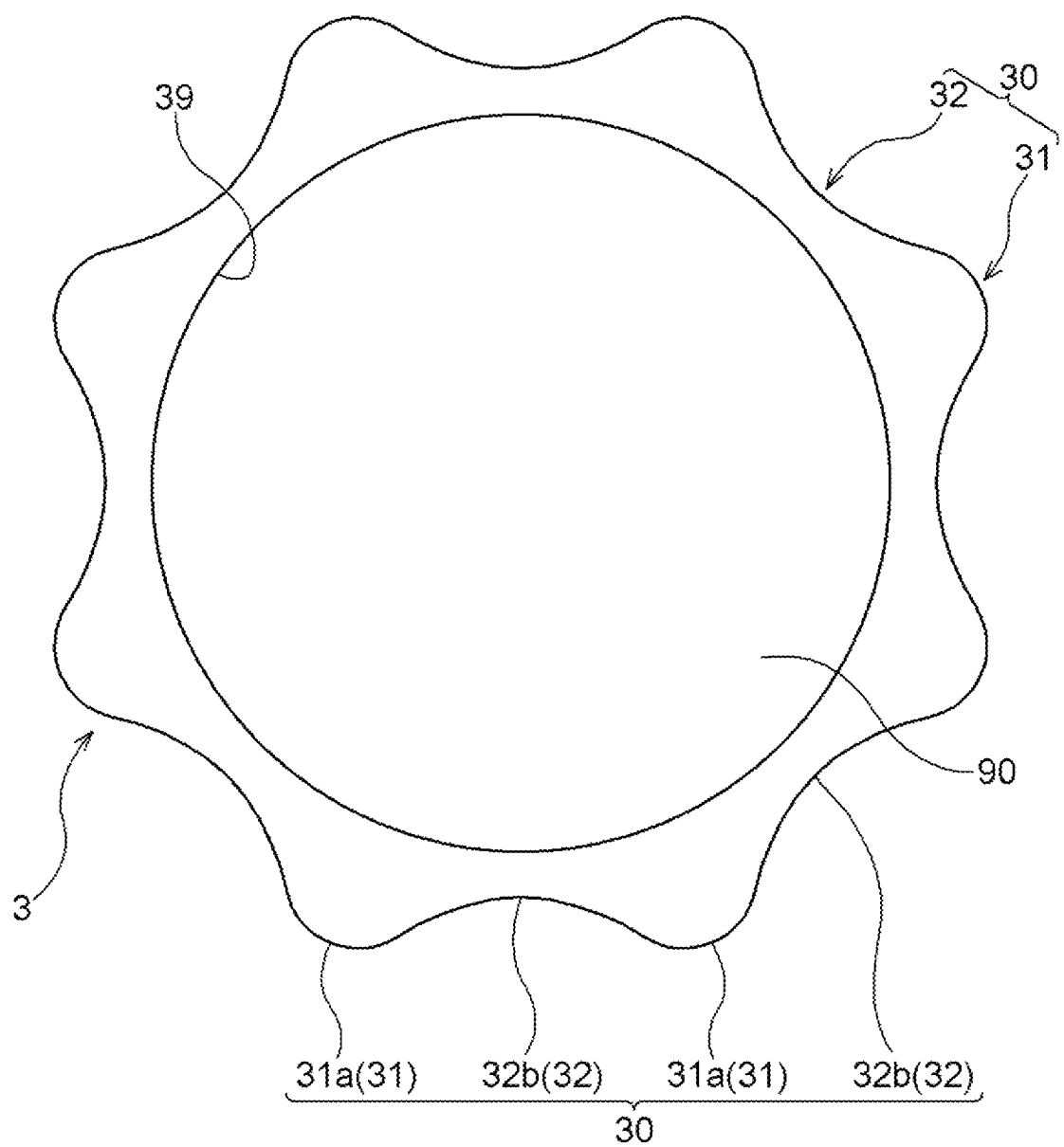
FIG. 3 is a plan view of a rotary plate.

FIG. 3 illustrates the rotary plate 3 in a plan view. As illustrated in FIG. 3, the rotary plate 3 is an annular-shaped plate in which a penetration hole 39 coaxial with an axis of the rotary plate 3 is formed, with the annular-shaped plate being made of metal such as iron or aluminum or made of metal alloy. An outer circumferential edge portion or an inner circumferential edge portion of the rotary plate 3 is formed in a sine-wave shape. With the shaft 90 (see FIG. 1) being inserted into the penetration hole 39, the rotary plate 3 rotates integrally with the shaft 90. In the present embodiment, in the illustrated exemplified case, the outer circumferential edge portion of the rotary plate 3 is formed in a sine-wave shape in which a diameter of the rotary plate 3 becomes larger and smaller smoothly and repeatedly in a direction along the circumferential direction of the rotary plate 3 in such a way that a crest portion 31 and a trough portion 32 are alternately arranged. Hereinafter, the outer circumferential edge portion formed in such a sine-wave shape is referred to as a target portion 30. In FIG. 3, the target portion 30 is constituted by each region between a top portion 31a of the crest portion 31 and a trough bottom 32a of the trough portion 32 over an entire circumference of the rotary plate 3.

In the present embodiment, the rotary plate 3 is mounted in the eight-pole motor 200, and thus, the target portion 30 is formed in such a way as to include eight cycles of the crest portions 31 and the trough portions 32. When the motor 200 includes k poles (k is a multiple of 2), the target portion 30 is formed in such a way as to include k cycles of the crest portions 31 and the trough portions 32.

[Printed Circuit Board, First Coil, and Second Coil Group]

Figure 4:
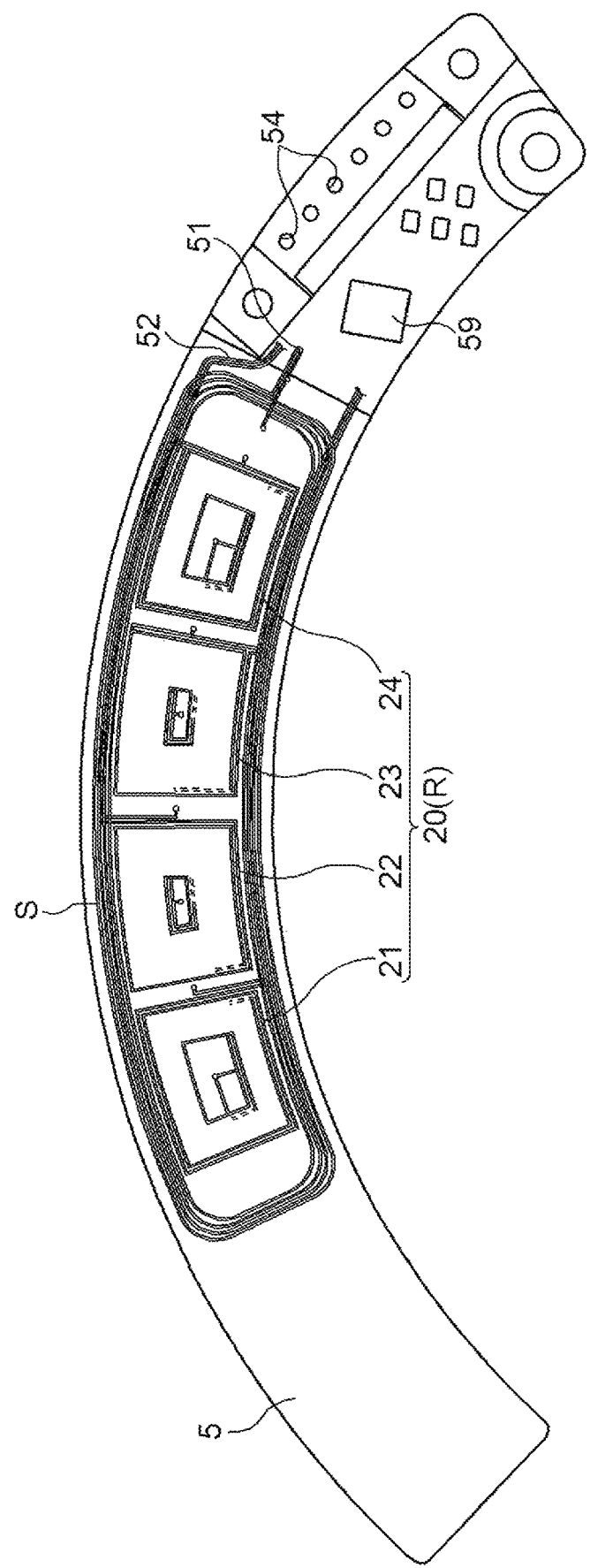
FIG. 4 is a diagram illustrating a structure of a printed circuit board.
Figure 5:
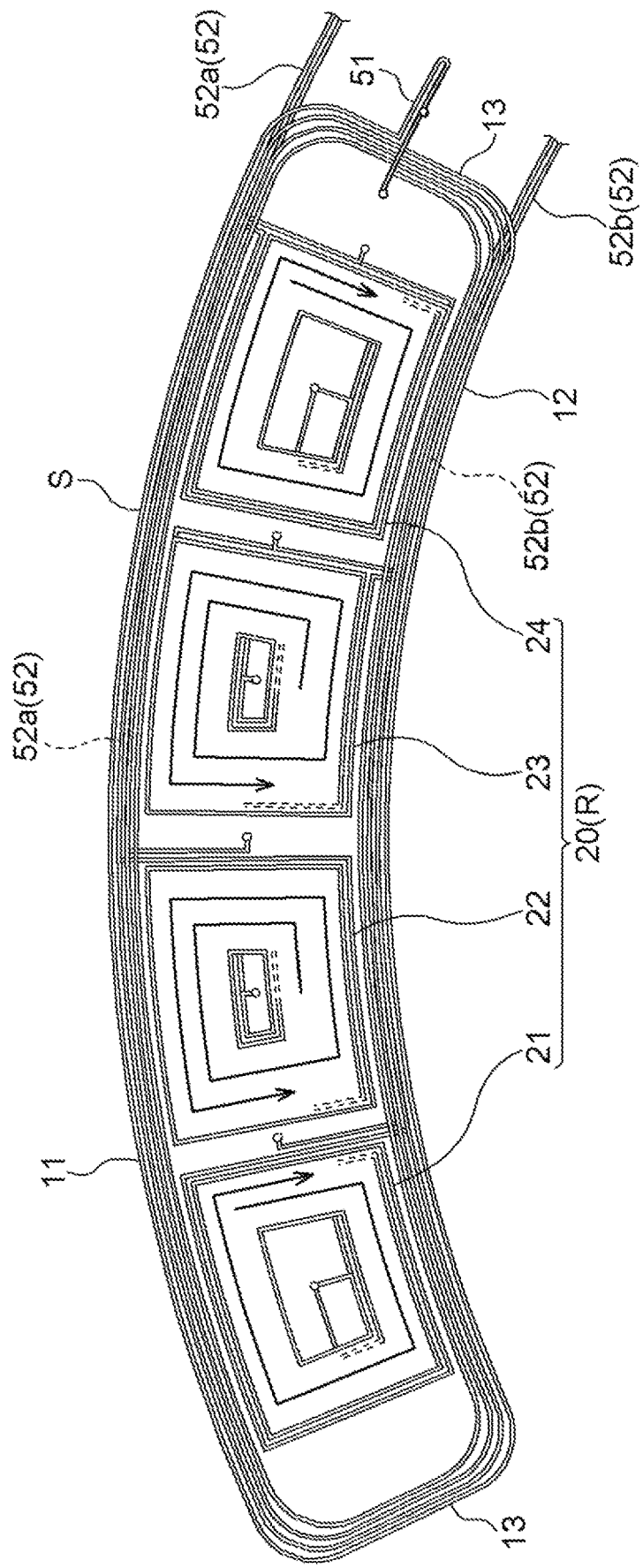
FIG. 5 is a diagram illustrating arrangement and configurations of a primary coil and secondary coils.
Figure 6:
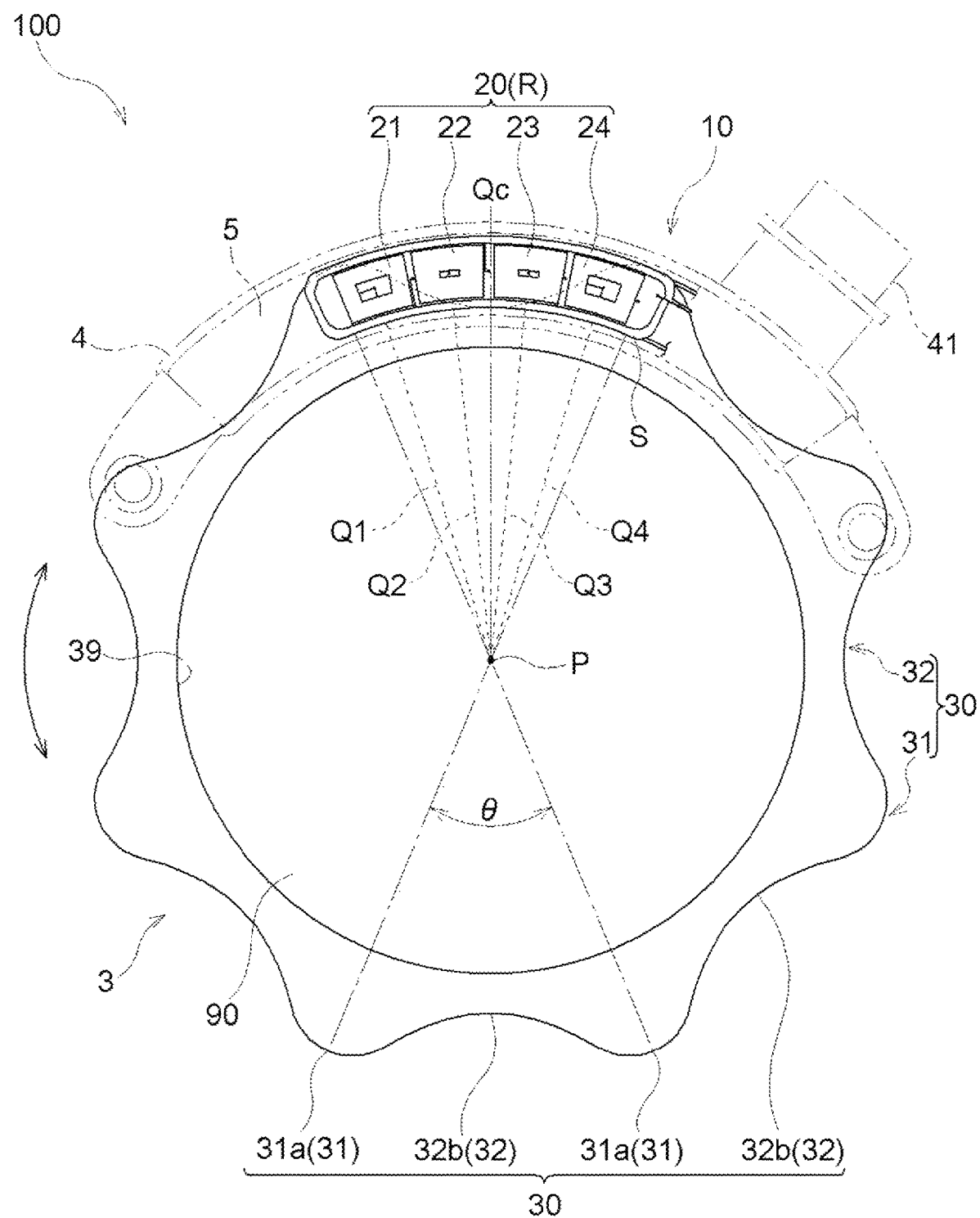
FIG. 6 is a diagram illustrating a shape of a rotary plate and a positional relation between the primary and secondary coils and the rotary plate.
Figure 7:
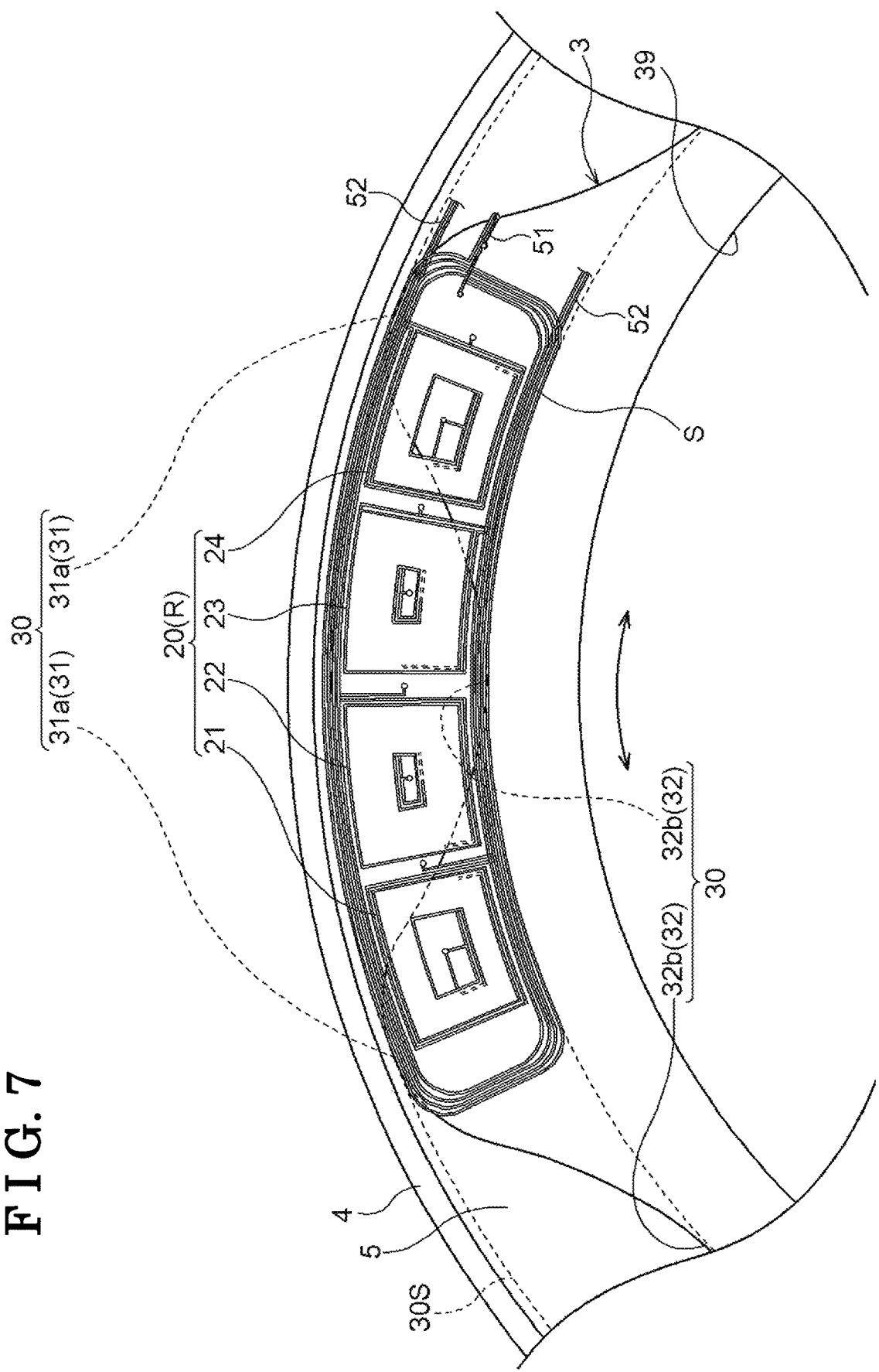
FIG. 7 is a partially enlarged view illustrating arrangement of the primary coil, the secondary coil, and the target portion.

FIG. 4 is a diagram schematically illustrating a structure of the printed circuit board 5 formed in the circular-arc and plate shape in a plan view (the same as an axial-direction view) of the printed circuit board 5. FIG. 5 is a diagram illustrating arrangement of the first coil S, the second coil group R, and intermediate wirings 51 and 52. FIG. 5 illustrates the first coil S and the second coil group R in a front view (the same as an axial-direction view) of coil loops. FIG. 6 is a diagram illustrating a shape of the rotary plate 3 and a positional relation of the first coil S and the second coil group R to the rotary plate 3. FIG. 7 is a partially enlarged view illustrating a positional relation of the first coil S and the second coil group R to the target portion 30.

As illustrated in FIG. 4, the printed circuit board 5 is a printed circuit board (PCB) including at least two layers (including two layers in the present embodiment), for example. The printed circuit board 5 includes not only the above-described first coil S, second coil group R, and sensor IC 59, but also the intermediate wiring 51 that electrically connects the first coil S and the sensor IC 59 to each other, and the intermediate wiring 52 that electrically connects the second coil group R and the sensor IC 59 to each other. In the printed circuit board 5, a plurality of through holes 54 are formed, and are electrically connected to the sensor IC 59 and connected to the output connector 41.

In the printed circuit board 5 of the present embodiment, the first coil S, the second coil group R, and the intermediate wirings 51 and 52 are formed (wired) as wiring patterns. The first coil S and the intermediate wiring 51 are formed in the layer on one side in the printed circuit board 5 (e.g., the layer on the side more distant from the rotary plate 3 illustrated in FIG. 1). The second coil group R and the intermediate wiring 52 are formed in the layer on an opposite side in the printed circuit board 5. The sensor IC 59 is surface-mounted on the layer where the first coil S is formed, for example. In the present embodiment, in the circumferential direction of the circular arc of the printed circuit board 5, the through holes 54 and the sensor IC 59 are arranged on one end side, and the first coil S and the second coil group R are arranged on an opposite end side. The second coil group R is arranged inside the loop of the first coil S in a front view of the printed circuit board 5, as described below.

The first coil S is a magnetic field generation mechanism, and generates a first magnetic field by being supplied with high-frequency current. The first coil S applies the first magnetic field to the rotary plate 3 (refer to FIG. 1). As illustrated in FIG. 4 and FIG. 5, the first coil S is wound in such a way as to include four rounded corners each having a circular-arc shape in a front view. The intermediate wiring 51 is electrically connected to both ends of the winding (wiring pattern) of the first coil S, and extends toward the sensor IC 59 from an end portion included in the first coil S and positioned on a side closer to the sensor IC 59 (refer to FIG. 4).

As illustrated in FIG. 5, in the first coil S, a length of one side (hereinafter, referred to as an outer side 11) that forms an arc on a longer side (on a radial-direction outer side) is at least three times a side (hereinafter, referred to as an end side 13) that intersects with this arc. In the present embodiment, a length of the one side that forms the arc on the longer side is approximately six times a length of the side that intersects with this arc. One side that forms an arc on a shorter side (an inner side of the arc) of the first coil S is referred to as an inner side 12.

As illustrated in FIG. 6 or FIG. 7, the first coil S is arranged in such a way that the circular arc of the first coil S is along a rotational direction (circumferential direction) of the rotary plate 3 in a plan view of the printed circuit board 5. The first coil S is arranged in such a way as to overlap with the target portion 30. Thereby, the first magnetic field from the first coil S is applied to the target portion 30. In the target portion 30, a second magnetic field is generated by eddy current generated in response to the first magnetic field.

When the rotary plate 3 rotates, the second coil group R repeatedly approaches and separates from the crest portions 31 of the target portion 30. In other words, the second coil group R is alternately switched between a state of facing the crest portion 31 in the sine-wave shape and a state of facing the trough portion 32. By this approaching and separating, the second magnetic field associated with the sine-wave shape is input to the second coil group R. In the present embodiment, in the target portion 30 that is a region included in the rotary plate 3 and facing the first coil S, the second magnetic field is generated by application of the first magnetic field, and thus, a strength and a weakness of the second magnetic field detected by the second coil group R are associated with areas of parts where the target portion 30 of the rotary plate 3 faces the first coil S.

FIG. 7 illustrates, as a rotation trajectory 30S, a trajectory of the target portion 30 when the rotary plate 3 rotates. In the present embodiment, the first coil S and the second coil group R are arranged in such a way as to completely overlap with the rotation trajectory 30S of the target portion 30 in a plan view of the printed circuit board 5. A radial-direction width of the first coil S is equal to or smaller than a radial-direction width of the rotation trajectory 30S (a radial-direction width of the target portion 30). FIG. 7 illustrates the case where a radial-direction width of the first coil S is the same as a radial-direction width of the rotation trajectory 30S. As a result, noise in output of induced current from the second coil group R can be reduced, and an SN ratio of the sensor 100 can be improved. Increasing an amount of change in output of the induced current can raise a sensitivity of the sensor 100.

The first coil S is arranged over a range that overlaps with a range slightly larger than a region (a region including a pair of the crest portion 31 and the trough portion 32) of a rotational-angle range corresponding to one cycle of the sine-wave shape of the target portion 30 in the rotational direction (circumferential direction) of the rotary plate 3. In other words, a configuration is made in such a way that a length of the outer side 11 of the first coil S is longer than an arc length corresponding to a rotational angle of one cycle of the sine-wave shape of the target portion 30.

The second coil group R illustrated in FIG. 4 to FIG. 7 is a magnetic field reception mechanism that receives a magnetic field and thereby outputs induced current. The second coil group R receives the second magnetic field, and sends, to the sensor IC 59 (refer to FIG. 2 and FIG. 3), induced current associated with the second magnetic field. The second coil group R is arranged inside the loop of the first coil S. The second coil group R includes 4n (n is a natural number; n=1 in present embodiment) second coils 20 (one example of secondary coils).

As illustrated in FIG. 6 and FIG. 7, the second coils 20 are arranged in a line in a circular-arc shape along the rotational direction (circumferential direction) of the rotary plate 3 in a plan view of the printed circuit board 5. The second coils 20 are arranged in such a way that the adjacent second coils 20 are separated from each other in a front view. Since the second coil group R is arranged in such a way as to completely overlap with the rotation trajectory 30S of the target portion 30 as described above, the second coils 20 are naturally arranged in such a way as to completely overlap with the rotation trajectory 30S. A strength and a weakness of the second magnetic field detected by the second coils 20 are associated with areas of parts that are included in the rotary plate 3 and that the second coils 20 face, and thus, each of the second coils 20 outputs induced current having a sine-wave amplitude (note that an amplitude center is not zero) associated with the target portion 30.

Hereinafter, for convenience of description, in some cases, the second coils 20 are referred to as the second coils 21 to 24 in the order of being more distant from the sensor IC 59 (refer to FIG. 4).

The second coil group R is arranged in such a way as not to overlap with the first coil S in a front view. Specifically, the second coils 20 are adjacent to the outer side 11 and the inner side 12 of the first coil S without overlapping with the outer side 11 and the inner side 12 in a front view. The second coils 21 and 24 are separated from the end sides 13 and 13 of the first coil S in the front view. By such arrangement in which the second coil group R does not overlap with the first coil S in the front view, the printed circuit board 5 can be formed as a double-sided through-hole circuit board formed with a two-layer printed circuit board, and thus, cost can be reduced.

Meanwhile, the intermediate wiring 52 (intermediate wiring 52b) connected to the second coils 21 and 23 is arranged in such a way that most of the intermediate wiring 52 (intermediate wiring 52b) overlaps with the inner side 12 (first coil S) in a front view, and the intermediate wiring 52 (intermediate wiring 52a) connected to the second coils 22 and 24 is arranged in such a way that most of the intermediate wiring 52 (intermediate wiring 52a) overlaps with the outer side 11 (first coil S) in the front view. By such arrangement in which the intermediate wiring 52 overlaps with the first coil S in the front view, a magnetic field generated by the first coil S is applied in parallel to the arrangement plane of the intermediate wiring 52, and thus, noise occurrence in the intermediate wiring 52 can be prevented. Thereby, detection accuracy of a rotational angle can be improved. Since the intermediate wiring 52 itself is also a part of the second coil group R, when a magnetic field is applied perpendicularly to the arrangement plane of the intermediate wiring 52, noise due to the electromagnetic induction occurs in the intermediate wiring 52, causing an offset of an output waveform.

As illustrated in FIG. 4 and FIG. 5, each second coil 20 is wound in such a way as to include four rounded corners each having a circular-arc shape in a front view. The second coils 20 are arranged in line in a circular-arc shape, and the second coils 20 (the second coils 21 and 24 in the present embodiment) arranged on end sides each have the number of turns smaller than the number of turns of each of the adjacent second coils 20 (the second coils 22 and 23 in the present embodiment) on an inner side. Among the 4n second coils 20 arranged in the circular-arc shape, the second coils 21 and 24 positioned symmetrically with respect to a center of the line have the same number of turns, and the second coils 22 and 23 positioned symmetrically with respect to the center of the line have the same number of turns. The 4n second coils 20 have the same outer shape and the same winding density. In the present embodiment, the second coils 21 and 24 arranged on the end sides in the line of the four second coils 20 arranged in the circular-arc shape each have the number of turns smaller than the number of turns of each of the second coils 22 and 23 arranged on the inner side in the line. As a result, an area of an inner space of each of the second coils 21 and 24 is larger than an area of an inner space of each of the second coils 22 and 23.

As illustrated in FIG. 6, the respective second coils 20 are arranged at positions of a substantially equal interval in a range (a range corresponding to an angle θ between the adjacent top portions 31a and 31a) of a rotational angle corresponding to one cycle of the sine-wave shape in the target portion 30 in the rotational direction (circumferential direction) of the rotary plate 3. In other words, the respective second coils 20 are arranged substantially at positions of an interval of a pitch (90 degrees in terms of an electrical angle) that is one fourth of an electrical angle of 360 degrees corresponding to a mechanical angle of 45 degrees of the motor 200 (refer to FIG. 1) having the eight poles.

In the present embodiment, the second coils 21 to 24 are arranged in such a way as to be shifted from each other at an interval of approximately 0.25 cycles in relation to one cycle of the sine-wave shape in the target portion 30. As a result, the second coils 21 to 24 output induced current having sine-wave amplitudes (note that the baseline is not zero) whose phases are shifted at an interval of 0.25 cycles in this order.

In the present embodiment, as illustrated in FIG. 5 and others, in the second coil group R, the second coils 21 and 23 as a combination whose winding directions are opposite to each other and whose positions are shifted from each other by 0.5 cycles in relation to the cycle of the sine-wave shape of the target portion 30 are selected as one set, the second coils 22 and 24 as a combination whose winding directions are opposite to each other and whose positions are shifted from each other by 0.5 cycles are selected as another set, and the coils in each of the sets are connected to each other in series by the intermediate wiring 52, whereby induced current having a two-times larger amplitude of a sine-wave shape is output from each of the sets, with a center of an amplitude being made approximately zero, with noise being canceled. In the present embodiment, the sensor IC 59 (refer to FIG. 2 and FIG. 4) detects the induced current output from each of the two sets of the second coils 20, and thereby acquires information such as a rotational angle of the rotary plate 3 (refer to FIG. 1 and FIG. 3), and thus, it is possible to achieve a large detection sensitivity (output) as well as accurate rotational-angle detection in which noise is reduced.

As described above, the second coils 20 are arranged at positions of a substantially equal interval in a range of a rotational angle corresponding to one cycle of the sine-wave shape of the target portion 30 in the rotational direction (circumferential direction) of the rotary plate 3, and in order to cancel a strongness and a weakness of the second magnetic field caused by a strongness and a weakness of the first magnetic field in the rotational direction (in the present embodiment, in the circumferential direction, magnetic fields near the end sides 13 and 13 of the first coil S are each stronger than a magnetic field on inner side thereof), all of the 4n second coils 20 arranged in the circular-arc shape may be arranged in such a way as to be slightly shifted toward the ends in the line from the positions of an equal interval in a range (a range corresponding to the angle θ between the adjacent top portions 31a and 31a; in the present embodiment, the angle θ is 45 degrees) of a rotational angle corresponding to one cycle of the sine-wave shape in the target portion 30 in the rotational direction (circumferential direction) of the rotary plate 3. Thereby, concerning detection of a rotational angle of the rotary plate 3 when the rotary plate 3 rotates, a delay error for the second coil 20 on a rotational-direction forward side is corrected, and an advance error for the second coil 20 on a rotational-direction backward side is corrected. Displacement amounts of the second coils 20 on the inner side in the line may be set in such a way as to be larger than displacement amounts of the second coils 20 on the end sides in the line. Thereby, a phase difference between the second coils 21 and 23 and a phase difference between the second coils 22 and 24 can be each made equal to 0.5 cycles.

In FIG. 6, the imaginary lines Q1 to Q4 indicate imaginary straight lines that pass though axes of the second coils 21 to 24 and the axis P of the rotary plate 3 in a plan view, and the imaginary line Qc indicates an imaginary straight line that passes through the axis P and the center of the second coil group R in the rotational direction of the rotary plate 3.

The second coil 21 is displaced in arrangement in such a way that an intersection angle made by the virtual line Q1 and the virtual line Qc becomes larger than three eighths of the angle η. The second coil 22 is displaced in arrangement in such a way that an intersection angle made by the virtual line Q2 and the virtual line Qc becomes larger than one eighth of the angle θ. The angle displacement amount of the second coil 21 is set in such a way as to be larger than the angle displacement amount of the second coil 22.

The second coil 23 is displaced in arrangement in such a way that an intersection angle made by the virtual line Q3 and the virtual line Qc becomes larger than one eighth of the angle θ. The second coil 24 is displaced in arrangement in such a way that an intersection angle made by the virtual line Q4 and the virtual line Qc becomes larger than three eighths of the angle θ. The angle displacement amount of the second coil 24 is set in such a way as to be larger than the angle displacement amount of the second coil 23.

As described above, the numbers of turns of the 4n second coils 20 are set in such a way as to differ between the end sides and the inner side, and arrangement of the second coils 20 is changed from equal-interval arrangement, whereby a strongness and a weakness of the second magnetic field caused by a strongness and a weakness of the first magnetic field due to a position difference are corrected, range widths of induced current generated in the respective second coils 20 are made uniform, sensitivities of the respective second coils 20 are made uniform, and detection accuracy can be improved.

As illustrated in FIG. 5, the winding directions of the 4n second coils 20 arranged in a circular-arc shape are alternately reversed in turn from each end side in the line toward the center. The winding directions of the second coils 20 (the second coils 22 and 23 in the present embodiment) that are adjacent to each other at the center of the line are the same. The winding directions of the second coils 20 (the second coils 21 and 24 in the present embodiment) on the one end side and the opposite end side in the line are the same.

Combining the second coils 20 whose winding directions are reverse to each other as described above can reduce noise of induced current output from the second coil group R, and can raise a sensitivity (output).

Thus, it is possible to provide an inexpensive and highly accurate rotational angle detection sensor.

Different Embodiments (1) In the above-described embodiment, in the exemplified case described above, the first coil S, the second coil group R, and the intermediate wirings 51 and 52 are formed as wiring patterns in the printed circuit board 5, but the first coil S, the second coil group R, and the intermediate wirings 51 and 52 are not limited to wiring patterns. Particularly, the first coil S and the second coil group R may be loops (coils) parallel to the printed circuit board 5.

(2) In the above-described embodiment, in the exemplified case described above, the intermediate wiring 52 overlaps with the first coil S in the front view, but the intermediate wiring 52 does not necessarily overlap with the first coil S.

(3) In the above-described embodiment, in the exemplified case described above, all of the second coils 20 are displaced in the rotational direction of the rotary plate 3, but all of the 4n second coils 20 do not necessarily need to be displaced, and only a part or none of the second coils 20 may be displaced.

(4) In the above-described embodiment, in the exemplified case described above, the first coil S and the second coil group R are arranged in such a way as to completely overlap with the rotation trajectory 30S of the target portion 30 in the plan view of the printed circuit board 5, but the first coil S and the second coil group R do not necessarily need to completely overlap with the rotation trajectory 30S. The first coil S and the second coil group R may at least partially overlap with the rotation trajectory 30S of the target portion 30.

The configurations disclosed in the above-described embodiments (including the different embodiments; the same applies to the following) can be applied in combination with the configurations disclosed in others of the embodiments, as long as no contradiction occurs. The embodiments disclosed in the present description are exemplifications, embodiments of this disclosure are not limited thereto, and appropriate modifications can be made without departing from the scope of the object of this disclosure.

This disclosure can be applied to a rotational angle sensor.

A rotational angle sensor includes an annular rotary plate and a printed circuit board. The rotary plate is made of metal. In the printed circuit board, a primary coil supplied with high-frequency current and a secondary coil group outputting induced current to a detection IC detecting the induced current are arranged in such a way that loops of the primary coil and the secondary coil group are along a surface of the printed circuit board. The rotary plate includes a target portion whose outer circumferential edge portion or inner circumferential edge portion is formed in a sine-wave shape. The primary coil is arranged in such a way as to overlap with the target portion in a plan view of the printed circuit board, and is formed in a circular-arc shape along a rotational direction of the rotary plate. The secondary coil group includes 4n (n is a natural number) secondary coils arranged in a line along the rotational direction, on an inner circumferential side of the primary coil. The number of turns of the secondary coil on an end side in the line is smaller than the number of turns of the secondary coil on an inner side in the line.

According to the above-described configuration, the secondary coils receive a magnetic field from the target portion being generated by a magnetic field generated by the primary coil supplied with high-frequency current, and a rotational angle of the rotary plate can be detected. Specifically, the magnetic field generated by the primary coil causes eddy current to be generated in the target portion formed in the sine-wave shape. In the target portion, the magnetic field due to this eddy current is further generated. This magnetic field fluctuates in association with the sine-wave shape. Reception of this fluctuating magnetic field enables detection of a rotational angle of the rotary plate. In the case of performing such detection, according to the above-described configuration, arrangement is made in such a way that the rotary plate overlaps with the primary coil and the secondary coil group in a plan view of the printed circuit board, and in other words, the rotary plate faces the primary coil and the secondary coil group, and influence of positional deviation in the arrangement is unlikely to occur. Therefore, manufacturing can be made at low cost, and angle detection accuracy becomes high.

More detailed description is as follows. The target portion is formed in the sine-wave shape, and the primary coil and the secondary coil group are arranged in such a way as to overlap with this target portion, and are arranged in a line along the rotational direction (hereinafter, simply referred to as the rotational direction) of the rotary plate. Thereby, when the rotary plate rotates, each of secondary coils of the secondary coil group repeatedly approaches and separates from crest portions sequentially formed in the target portion of the sine-wave shape. In other words, a state of overlapping with the crest portion of the sine-wave shape and a state of overlapping with a trough portion are alternately switched from each other. By this approaching and separating, a magnetic field associated with the sine-wave shape is input to each of the secondary coils, and thereby, induced current is generated. Detection of change in induced current generated in each secondary coil enables detection of a rotational angle of the rotary plate.

The secondary coil group includes 4n secondary coils (n is a natural number) whose number is a multiple of four, and thus, for example, a section corresponding to one cycle of the sine-wave shape in the target portion is divided into four sections, and a magnetic field generated in each of the four sections can be separately detected, whereby detection accuracy of a rotational angle is improved.

Among magnetic fields generated by the primary coil arranged along the rotational direction, magnetic fields near both end portions (i.e., both end portions of the secondary coils arranged in a line) in the rotational direction are larger than a magnetic field in the center portion, however, when the number of turns of the secondary coil on the end side (the end side in the rotational direction) in the line is made smaller than the number of turns of the secondary coil on the inner side (the center side in the rotational direction) in the line, a strongness and a weakness of the magnetic field due to a positional difference in the rotational direction are corrected, a range width of induced current generated in each of the secondary coils is made uniform, a sensitivity of each secondary coil is made uniform, and detection accuracy of a rotational angle can be improved.

Note that, when loops of the primary coil and coils of the secondary coil group are arranged along a surface of the printed circuit board, the primary coil and the secondary coil group may be surface-mounted on the printed circuit board, or may be formed as wiring patterns.

In the rotational angle sensor, an intermediate wiring that electrically connects the secondary coil and the detection IC to each other may be arranged in such a way as to overlap with a winding of the primary coil in a plan view of the printed circuit board.

According to the above-described configuration, the intermediate wiring is arranged in such a way as to overlap with the winding of the primary coil, and thus, the intermediate wiring is unlikely to be influenced by the magnetic field generated by the primary coil, noise in output of induced current from the secondary coil is reduced, and an SN ratio of the rotational angle sensor can be improved.

In the rotational angle sensor, all of the secondary coils constituting the secondary coil group may be arranged in such a way as to be displaced toward end sides in a line from positions at an equal interval in a range of a rotational angle corresponding to one cycle of the sine-wave shape in the target portion.

As described above, a section corresponding to one cycle of the sine-wave shape in the target portion is divided at an equal interval into four sections, and a magnetic field generated in each of the four sections is separately detected, whereby detection accuracy of a rotational angle is improved. At this time, there is a case where a phase shift (delay or advance) of output of induced current from the secondary coil occurs due to unevenness of a distribution of a magnetic field generated by the primary coil and unevenness of a magnetic field distribution caused by a structural feature around the secondary coil group. However, by displacing the secondary coils to the end sides that are closer to these secondary coils, correction can be made in such a way as to reduce the phase shift, and thus, detection accuracy is improved.

In the rotational angle sensor, in the secondary coil group, a displacement amount of a secondary coil on an inner side in a line may be larger than a displacement amount of a secondary coil on an end side in the line.

Normally, unevenness of a magnetic field distribution in the center portion is larger than unevenness of magnetic field distributions near both end portions in the rotational direction, and thus, a phase shift (delay or advance) of output of induced current from a secondary coil is likely to occur in a secondary coil closer to the center portion. In this view, according to the above-described configuration, when a displacement amount of a secondary coil on the inner side in a line is larger than a displacement amount of a secondary coil on the end side in the line, correction can be made in such a way as to reduce the phase shift, whereby detection accuracy is improved.

In the rotational angle sensor, the secondary coils adjacent to each other in the secondary coil group may be arranged in such a way as to be separated from each other in a plan view of the printed circuit board.

According to the above-described configuration, the printed circuit board can be formed as a double-sided through-hole circuit board that is formed with a two-layer printed circuit board, and thus, cost can be reduced.

In the rotational angle sensor, the primary coil may be arranged in such a way as to completely overlap with a rotation trajectory of the target portion in a plan view of the printed circuit board.

According to the above-described configuration, the primary coil and the secondary coil group completely overlap with the rotation trajectory of the target portion in the plan view of the printed circuit board. Thereby, noise in output of induced current from the secondary coil group can be reduced, and an SN ratio of the rotational angle sensor can be improved. Further, a change amount of output of induced current is increased, and thus, a sensitivity of the rotational angle sensor can be raised.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotational angle sensor comprising:
an annular rotary plate being made of metal; and
a printed circuit board in which a primary coil supplied with high-frequency current and a secondary coil group outputting induced current to a detection IC detecting the induced current are arranged in such a way that loops of the primary coil and the secondary coil group are along a surface of the printed circuit board, wherein
the rotary plate includes a target portion, an outer circumferential edge portion or an inner circumferential edge portion of the target portion being formed in a sine-wave shape,
the primary coil is arranged in such a way as to overlap with the target portion in a plan view of the printed circuit board, and is formed in a circular-arc shape along a rotational direction of the rotary plate, the primary coil being wound so as to include four rounded corners each having a circular-arc shape in a front view, a radial-direction outer side forming an arc, a radial-direction inner side forming an arc, and first and second end sides each intersecting the radial-direction outer side and the radial-direction inner side, the secondary coil group includes 4n (n is a natural number) secondary coils arranged along the rotational direction and inside the primary coil such that there is no overlap between the primary coil and the secondary coil group in the plan view of the printed circuit board, and a number of turns of the secondary coil on an end side in a line is smaller than a number of turns of the secondary coil on an inner side in the line.

2. The rotational angle sensor according to claim 1, wherein an intermediate wiring that electrically connects the secondary coil and the detection IC to each other is arranged in such a way as to overlap with a winding of the primary coil in a plan view of the printed circuit board.

3. The rotational angle sensor according to claim 1, wherein all of the secondary coils constituting the secondary coil group are arranged in such a way as to be displaced toward end sides in a line from positions at an equal interval in a range of a rotational angle corresponding to one cycle of the sine-wave shape in the target portion.

4. The rotational angle sensor according to claim 3, wherein, in the secondary coil group, a displacement amount of a secondary coil on an inner side in a line is larger than a displacement amount of a secondary coil on an end side in the line.

5. The rotational angle sensor according to claim 1, wherein the secondary coils adjacent to each other in the secondary coil group are arranged in such a way as to be separated from each other in a plan view of the printed circuit board.

6. The rotational angle sensor according to claim 1, wherein the primary coil is arranged in such a way as to completely overlap with a rotation trajectory of the target portion in a plan view of the printed circuit board.

* * * * *